(12) United States Patent
Rider

(10) Patent No.: US 7,966,209 B1
(45) Date of Patent: Jun. 21, 2011

(54) FEEDBACK LOOP FOR THE ASSESSMENT OF A USER INTERFACE OF A COMMUNICATIONS NETWORK AND A CONSTANT SUM SCALE GUI COMPATIBLE THEREWITH

(76) Inventor: Paul Rider, Los Angeles, CA (US)

( * ) Notice: Subject to any disclaimer, the term of this patent is extended or adjusted under 35 U.S.C. 154(b) by 1402 days.

(21) Appl. No.: 11/276,060

(22) Filed: Feb. 10, 2006

Related U.S. Application Data

(60) Provisional application No. 60/593,771, filed on Feb. 11, 2005.

(51) Int. Cl.
*G06Q 10/00* (2006.01)
*G06Q 30/00* (2006.01)
*G06Q 40/00* (2006.01)

(52) U.S. Cl. .................................. 705/7.29; 705/7.32
(58) Field of Classification Search .................. 705/10
See application file for complete search history.

(56) References Cited

U.S. PATENT DOCUMENTS

| 6,778,193 B2 * | 8/2004 | Biebesheimer et al. ....... 715/805 |
| 2002/0143468 A1 * | 10/2002 | Cheng et al. ....................... 702/1 |
| 2006/0199167 A1 * | 9/2006 | Yang et al. ...................... 434/365 |

OTHER PUBLICATIONS

Lawlis, et al.; "A Formal Process for evaluating COTS Software Products", (C) 2001 IEEE, Computer, pp. 58-63.*
Scenecio, Creating Other Numeric Response items Questions. 2004 p. 1-21.*

* cited by examiner

*Primary Examiner* — Susanna M Diaz
*Assistant Examiner* — Jamie H Swartz
(74) *Attorney, Agent, or Firm* — Sughrue Mion, PLLC

(57) ABSTRACT

A feedback loop for the assessment of a user interface of a communications network is based on feature units for analysis and comparison. These units are subset collections that are grouped together to perform a particular task or function. When, these units can be objectively and quantitatively assessed, and compared among various user interfaces. The quantification, assessment, market testing and comparison informs the feedback loop to reveal ways in which a user interface can be improved so as to benefit a company's ability to effectively communicate with its customers. A Constant Sum Scale question is used to support the comparison among user interface features, and is also applicable in a wide variety of contexts.

4 Claims, 6 Drawing Sheets

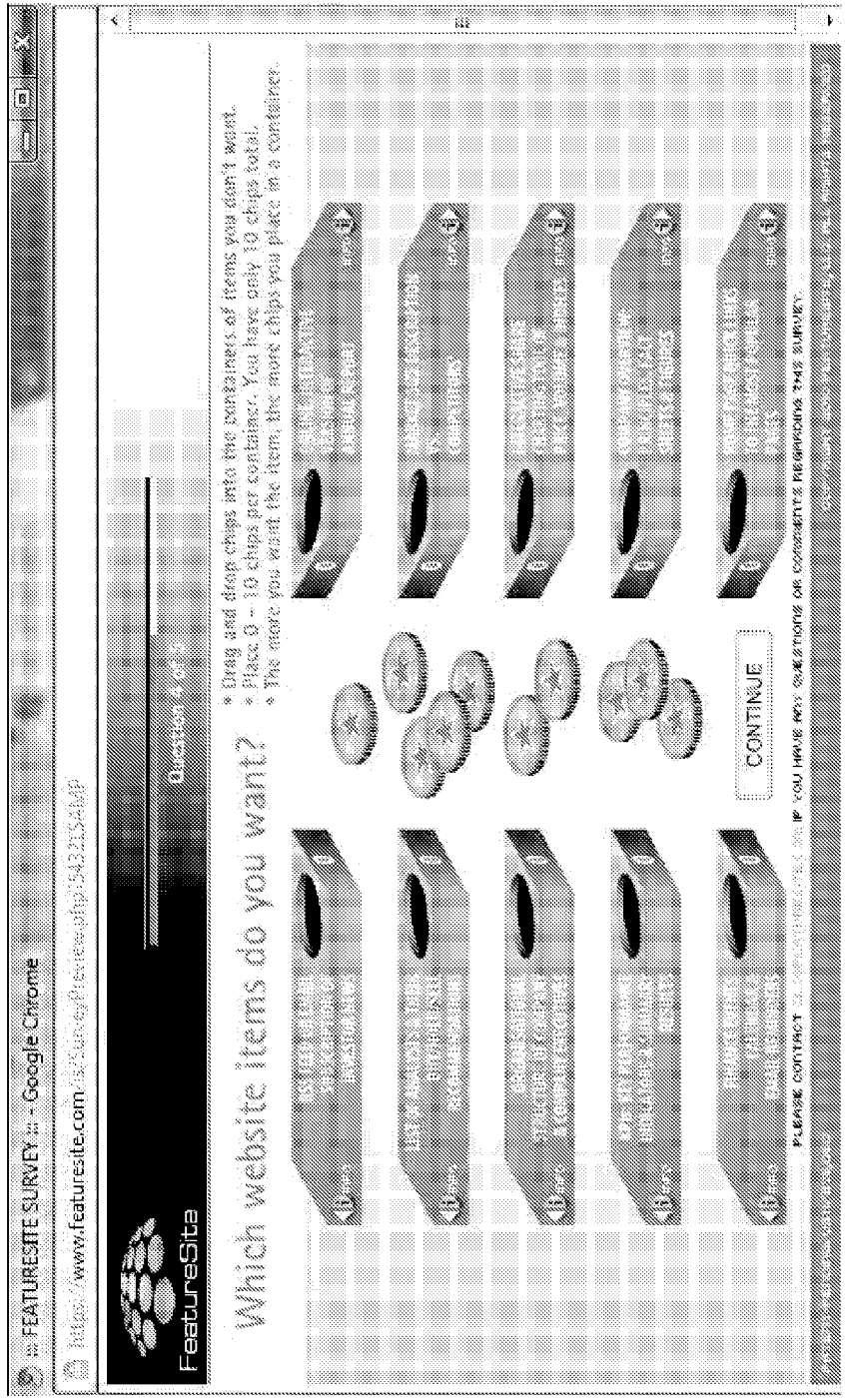
FIG. 3A COMMERCIAL EXAMPLE - INITIAL STATE
(10 evaluation tokens/chips available for placement in containers/buckets)

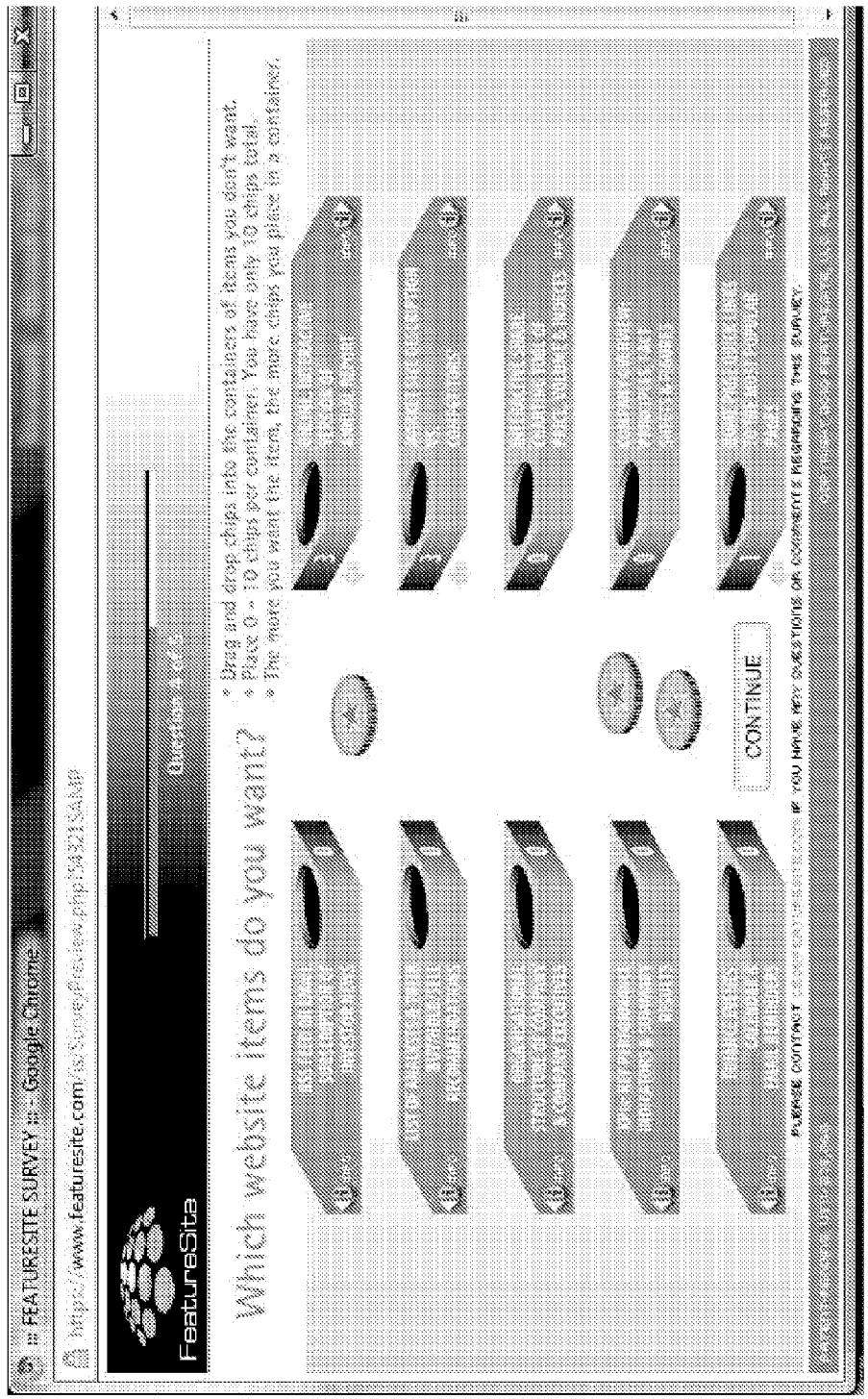
FIG. 3B COMMERCIAL EXAMPLE – IN PROGRESS
(7 of 10 evaluation tokens/chips have been placed by user into containers/buckets)

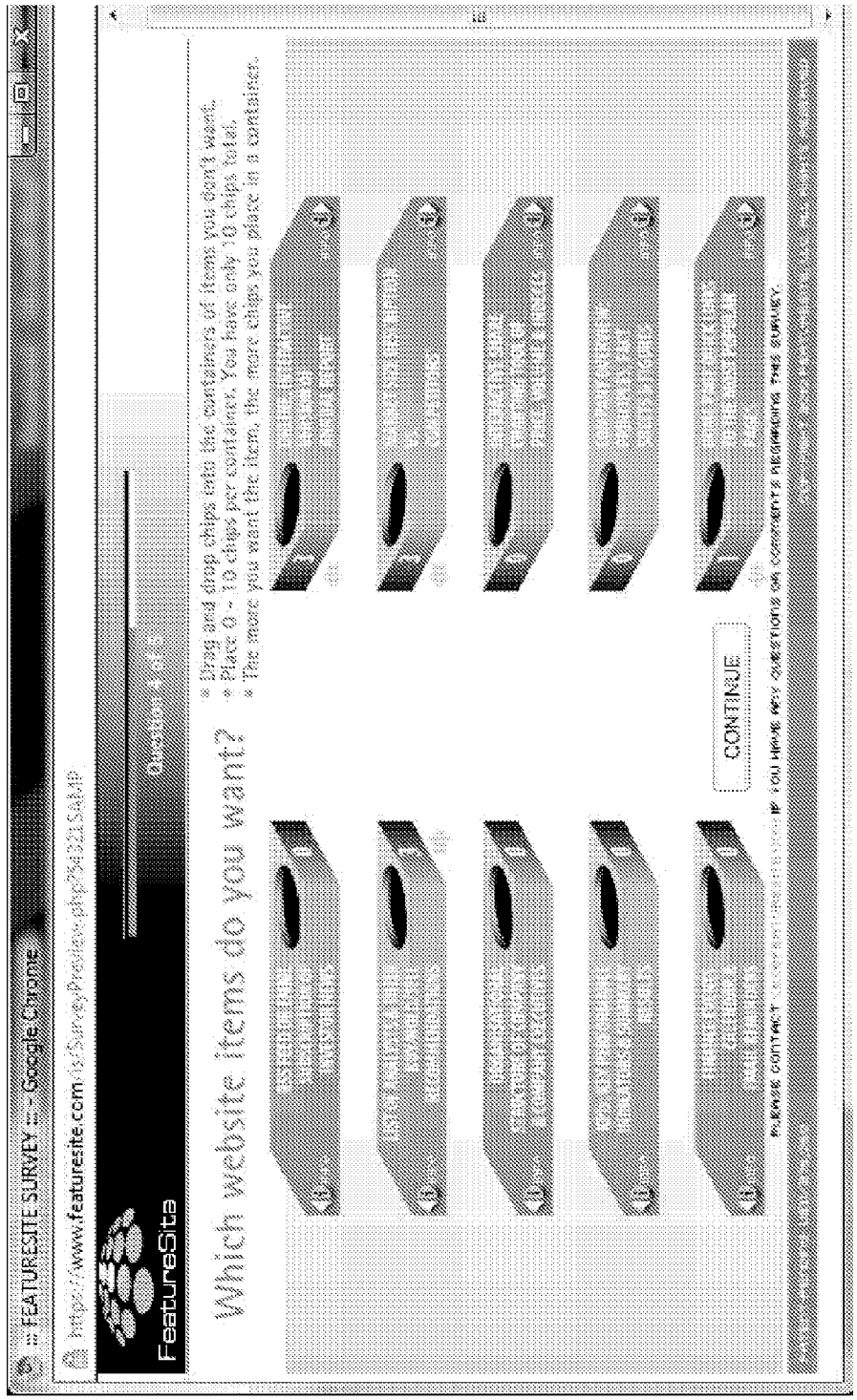
FIG. 3C COMMERCIAL EXAMPLE - COMPLETION STATE
(All 10 evaluation tokens/chips have been placed by user into containers/buckets)

FEEDBACK LOOP FOR THE ASSESSMENT OF A USER INTERFACE OF A COMMUNICATIONS NETWORK AND A CONSTANT SUM SCALE GUI COMPATIBLE THEREWITH

CROSS-REFERENCE TO RELATED APPLICATIONS

This application claims the benefit of U.S. Provisional Application No. 60/593,771, filed Feb. 11, 2005.

COPYRIGHT NOTICE

The disclosure of this patent document is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

1. Field of the Invention

The invention relates to marketing research and market research (both will be referred to herein, without loss of generality, simply as "market research"). In particular embodiments, the invention relates to market research involving websites, to market research involving the use of a Constant Sum Scale question, and to a combination of the two.

2. Related Art

Market Research Involving Websites

Companies are often uncertain of the overall usefulness and effectiveness of their websites. Companies are often uncertain of the usefulness and effectiveness of their websites for their most important, targeted customers.

Companies are often uncertain of the usefulness and effectiveness of individual website features. Companies are often uncertain of the usefulness and effectiveness of individual website features for their most important, targeted customers.

Companies lack comprehensive analytical tools and corresponding data for understanding the quality and value of website features and complete websites. Assessment and planning of website features that comprise a website are most often based on individual experiences, opinions and limited secondary research, but may also include website analytics and market research.

Companies lack evaluative, standardized measurements for comparing both individual website features and complete websites to those of other companies.

Website analytics are useful in understanding which websites and website features are being used (number of hits, page views, unique visitors, etc.), but provide no assessment of the quality of the individual website features and the complete website. Website analytics require additional study to identify a verifiable correlation between usage and quality and/or value. Without further study, website analytics require inference to postulate whether features are valuable and whether these features are meeting the needs of targeted customers.

Consultancies for websites, sometimes referred to as 'Website Audits,' 'Usability Inspections,' 'Usability Reviews' and/or 'Design Reviews,' help assess the effectiveness of website design, web page usability and website usability, but these efforts are based primarily on subjective analysis and the experience of individual consultants. Varying in quality and effectiveness, these consultancies lack a consistent, structured methodology for quantifying, analyzing and assessing current feature effectiveness, complete website effectiveness, or prospective future features.

Market research utilized to determine the value or quality (words such as 'satisfaction', 'importance,' 'effectiveness,' and/or 'usefulness' are often used to assess value/quality) of website features typically uses nominal or ordinal scales. Nominal and ordinal scale results provide information on the order of preferences. However, nominal and ordinal scale questions do not capture the magnitude of preference because it is impossible to infer interval size among response options for a question with a nominal or ordinal structure. The inability to quantify the relative position or distance between answer choices in nominal and ordinal scale questions is well documented in business and market research literature, such as Grossnickle and Raskin's *Handbook of Marketing Research* (McGraw-Hill, 2001), which is incorporated in relevant portion herein by reference, for its useful background information on that topic. In particular, the reader may refer to chapter 7 of this book.

Market Research Involving Constant Sum Scale

A Constant Sum Scale is described in detail by William G. Zikmund in *Business Research Methods* (Harcourt, Inc., 2000), which is incorporated in relevant portion herein by reference, for its useful background information on Constant Sum Scale questions. In particular, the reader may refer to chapter 14 of this book.

Market research utilizing the Constant Sum Scale is extremely limited. Constant Sum Scale questions make surveys difficult for respondents to understand and complete. Implementations even of online surveying tools involving Constant Sum Scale questions have utilized only 100 point or 100 percentage point scales. There are no known online survey options available that offer 10 point scales using numbers to add up to 10, or even other numbers.

Additionally, there are no online options available that offer visual representations (poker-type chips, 'play' money, etc.) of either 10 or 100 points. A significant drawback of Constant Sum Scale questions in their current form is that they require a highly educated respondent base due to the mathematical sophistication required by a survey respondent to allocate 100 points or 100 percentage points among a list of choice options.

100-point Constant Sum Scale questions, as they are conventionally implemented by companies performing online market research, create confusion and result in respondent fatigue, dropout and poor completion response rates.

One example of a state of the art use of Constant Sum Scale questions online may be found at www.questionpro.com, where there is used an approach in which a numerical calculation is performed for the user, who is required to enter numerical values corresponding to choices. Here, unfortunately for the user and surveyor alike, the user must monitor the numerical entry for each choice to ensure that the final total of all entries add up to 100 or 100 percent. As such, the numerical calculation does not sufficiently simplify the process and mathematical sophistication remains a requirement for respondents. Furthermore, such questions are not presently known to be used in relation to assessing a user interface of a communications network.

SUMMARY OF THE INVENTION

One objective of the invention, among others that will become apparent after reading this description, is to overcome the problems of the aforementioned methods.

As to market research involving websites and the like, there is provided a feedback loop for the assessment of a user interface of a communications network. In an embodiment, the communications network is the Internet and the user interface is a collection of modules according to the hypertext transfer protocol and other well-known Internet protocols. Such a collection of protocols and programs may also be referred to herein, for the sake of generality and not by way of limitation, as a website. Although the term "user interface of a communications network" may be understood to mean "website," various embodiments of the invention also relate to a user interface of a computer, namely, a graphical user interface (GUI). The context of the discussion will help the reader determine whether a website is meant or whether a GUI is meant.

Given that companies have limited resources for developing website features, an understanding of the relative importance, usefulness, quality, value and/or preference of each feature is integral for making budget allocation decisions on future website features. Only with information describing relative quality/value, can a website manager or owner make a fully informed decision of the costs and benefits of each feature compared to the next.

The disclosed feedback loop for the assessment of a user interface is based on identifying units that can be standardized, analyzed and compared. These standardized units, referred to herein as 'features,' are subset collections of hypertext transfer protocol and other well-known Internet transfer protocols that are grouped together to perform a particular task or site function. When identified and standardized as units, features can be objectively and quantitatively assessed and compared among various websites.

This quantification, assessment and comparison of features inform the feedback loop to reveal ways in which a website can be most efficiently and effectively improved to serve the needs of targeted customers.

At to market research involving the use of one or more Constant Sum Scale questions, there is provided a system, method, and computer program product implementing a constant sum evaluation method. Such a computer program product includes, for example, a computer readable medium and computer instructions on the medium. The computer instructions define operations to be carried out by the computer, and may include:

a. displaying a graphical user interface including various display regions such as a constant sum evaluation prompt, some selection items, and tokens;
b. providing, for the user interface, a user interaction module adapted to permit the user to give each one of the tokens a correspondence with a selection item;
c. detecting that the correspondence indication has been made for all of the tokens; and
d. storing in a memory an evaluation result based on the quantity of the tokens indicated for each selection item.

Constant Sum Scales implemented in the foregoing manner are particularly effective for assessing the importance and usefulness among product or service features in general because responses clearly communicate the rank order and relative magnitude of preference for each feature, and are easy to complete. By the way, when this description mentions the evaluation of the features of products or services, it will be appreciated that the teachings are relevant to products and/or services.

As to a combination of market research involving the websites, and involving the use of a Constant Sum Scale question, there is provided a system whereby the aforementioned quantification, assessment and comparison of features to inform the feedback loop includes using such a Constant Sum Scale question to provide evaluation results useful in the comparison of features.

According to this embodiment of the invention, Constant Sum Scales are uniquely effective for assessing preference among website features because they describe rank order, relative preference magnitude, and response distribution in the results of a single question. Consequently, market research surveys can be significantly shorter, limiting user dropout and increasing survey completion percentages.

The invention is now taught below by way of various specific exemplary embodiments explained in detail in the light of the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

As mentioned above, the invention relates to market research involving websites, to market research involving the use of a Constant Sum Scale question, and to a combination of the two. For the sake of brevity, a detailed description of a system involving the combination is first presented. Afterward, the more general embodiments are briefly described.

Embodiment 1

Figure 1:
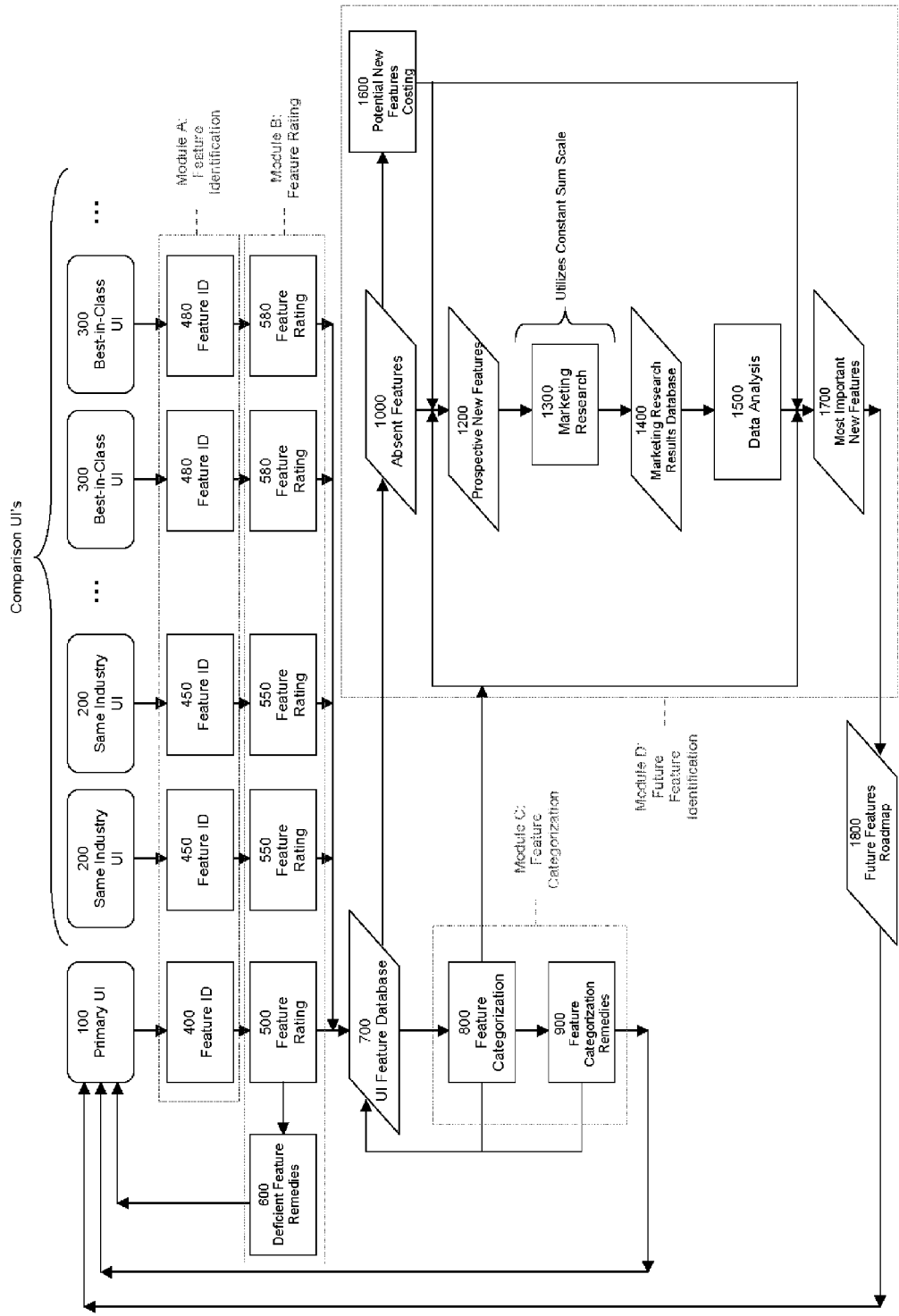
FIG. 1 is a flow diagram showing an overall feedback loop assessment system according to one embodiment of the invention;
b.

To help explain the concepts of the invention, the discussion may refer from time to time to a hypothetical, simplified website that is a subject for feedback and improvement. In FIG. 1, this hypothetical website is referred to as Primary UI 100.

Feature ID 400, part of Module A: Feature Identification and shown in FIG. 1, is a process for distinguishing features from non-features in a website. Such a standardization and itemization of features enables a detailed comparison of website characteristics, capabilities and functions. Feature ID 400 may be implemented as a completely non-automated process, a generally non-automated process with some automation support, or a substantially automated process with some participation by an analyst or operator. In this exemplary embodiment, the process of Feature ID 400 is part of Module A that receives feature identification inputs relating to a Primary UI 100. As will be mentioned below, Module A receives feature identification inputs also with respect to a plurality of Comparison UI's.

By way of exemplary illustration, a hypothetical website of a company that operates an Entertainment Theme Park may display hundreds or even thousands of features. Here is a partial list of the features that may be part of an Entertainment Theme Park website:
(1) music (on/off),
(2) interactive resort map,
(3) calendar of events,
(4) current and 5-day weather forecast calendar,
(5) online videos of selected attractions,
(6) customizable driving directions,
(7) downloadable brochures from the local Transit bus system,
(8) Theme Park Hotels feature comparison,
(9) hotels comparison matrix,
(10) attractions selection by Age Group (kids, toddler, teens),
(11) clickable map of special events,
(12) online viewable TV Commercials,
(13) 'My Plans' that allows users to build and save attractions itineraries, and
(14) purchase tickets online, etc.

In this hypothetical example, the Entertainment Theme Park website is the Primary UI 100, and the features identified and listed above are examples of the features that would be revealed during Feature ID 400.

Features acknowledged in Feature ID 400 are entered and stored in a spreadsheet or database referred to as the UI Feature Database 700. This UI Feature Database 700 may be implemented, in concrete terms, with a structure as common as a spreadsheet or basic database that facilitates flexible, efficient and effective data organization and analysis, or with a customized, complex structure, as is appropriate to the particular situation.

The standardization of user interface units, or features, makes quantitative analysis possible. To this end, it will be understood not only that Feature ID 400 receives feature identification inputs, but also that these inputs indicate discrete UI features.

In Feature Rating 500, a rating scale is applied to assess the effectiveness of each Primary UI 100 website feature. This rating process is not limited in form or method, but in its preferred embodiment, Feature Rating 500 includes at least five criteria: Visual Design, Interactivity, Content, Function, and Overall Experience.

Each of the first four criteria may have sub-criteria as follows: Visual Design (Appearance, Placement), Interactivity (Participation Requirement, Quality/Interest/Appropriateness), Content (Copy, Media), and Function (Performance, Ease of Use/Navigation). The fifth criterion, Overall Experience, provides additional scoring to emphasize the overall execution of the feature. Each criterion can receive 0-2 points and each feature can receive 0-10 total points for the five criteria. A feature may receive 0 points for each of the criterion if both of the two sub-criteria are missing or highly deficient; 1 point if one of the two sub-criteria is missing or highly deficient; and 2 points if both sub-criteria are met. The fifth criterion, Overall Experience, receives a 0 if one or more of the other criteria fail to the degree that it creates a significant, negative experience for the feature as a whole. The fifth criterion receives a 1 if the other criteria all have ratings of at least 1. A rating of 2 for the fifth criterion requires that the other features receive mostly ratings of 2 and that none of the missing criteria has a significant negative impact on the effectiveness of the entire feature.

A complete website rating is achieved by totaling and/or averaging each individual feature score. These ratings include the following: (1) an overall website score; (2) a total website feature rating by each criteria and/or sub-criteria; (3) an average website feature rating by each criteria and/or sub-criteria; (4) a total feature rating by feature function classification; and (5) an average feature rating by feature function classification. Other numerical comparisons are available as well.

To this end, there is provided Module B: Feature Rating for receiving the ratings mentioned above. In other words, Module B receives user ratings pertaining to the discrete UI features.

Rating information may be maintained in the UI Feature Database 700, and the rating score information may be computed in Module B and stored in the UI Feature Database 700 under control of Module B. Other arrangements are of course possible and fall within the scope of the invention.

In addition to providing a numerical rating to features of the Primary UI 100, the Feature Rating Module B may include a qualitative assessment, shown as Deficient Feature Remedies 600 in FIG. 1, to those features that are in need of improvement. These assessments point out the aspects of features that are underperforming and offer remedies as to how these features might be improved.

In order to compare websites and their features for the Feedback Loop of a User Interface, a group of additional websites is identified for assessment. These websites (collectively noted as Comparison UI's in FIG. 1) may be chosen from two groups of UI's: Same Industry UI 200 and Best-in-Class UI 300. Same Industry UI 200's are websites of companies in the same industry as the Primary UI 100 company. Not all Industry UI 200's are necessarily selected. Typically, the Industry UI 200's chosen are those with many high quality features. Best-in-class UI 300's are those websites that are identified as having many high-quality features. Best-in-Class UI 300's may come from any industry. The number of Same Industry UI's 200 and Best-in-Class UI's 300 chosen for assessment is variable. A higher number of Comparison UI's typically results in a more successful overall assessment and greater improvement to the Primary UI 100. The selection of the UI's for use may be performed in any conventional manner, including by manual means according to the judgment of the analyst or operator.

Substantially the same, systematic Feature ID 400 process that is performed on Primary UI 100 is applied to the selected Comparison UI's. That is, while the subjects for Feature ID 400, Feature ID 450 and Feature ID 480 differ, the tasks for Feature ID 400, 450 and 480 are fundamentally the same. The inclusive processes of Feature ID 400, 450 and 480 represent Module A.

Substantially the same, systematic Feature Rating 500 process that is performed on Primary UI 100 is applied to the selected Comparison UI's. That is, while the subjects for Feature Rating 500, Feature Rating 550 and Feature Rating 580 differ, the tasks for Feature Rating 500, 550 and 580 are fundamentally the same. However, only Primary UI 100 is the recipient of Deficient Feature Remedies 600 because the feedback loop is focused on providing improvements to the Primary UI 100, not the Comparison UI's. Feature Rating 500 and Deficient Feature Remedies 600, along with Feature Rating 550 and 580, are the components of Module B.

The features and feature scores identified in Module A and Module B may be entered and stored in the UI Feature Database 700.

Feature ID 400 and the various Feature ID 450's and Feature ID 480's may be compared in the UI Feature Inventory Database 700. The total combined list of features from various Feature ID 450's and 480's minus the list of features of Feature ID 400 represent the list of features that are absent from the Primary UI 100. This list of Absent Features 1000 of the Primary UI 100 may also be maintained in the UI Feature Database 700.

The list of Absent Features 1000 reveals opportunities for feature additions to the Primary UI 100. Through unique, Constant Sum Scale questions, absent features can be quantitatively tested through market research among targeted customers of the Primary UI 100's company to identify which ones of the Absent Features 1000 are most important. This is discussed in detail in subsequent paragraphs. The Absent Features 1000 process is the beginning step of Module D: Future Feature ID.

A classification by function (e.g., general branding, advertising, site tools, purchase management, etc.) of all inventoried features is performed on both the Primary UI 100 and the Comparison UI's. This classification of features by functional type, Feature Categorization 800, standardizes the user interface in groupings that are qualitatively and quantitatively analyzed and compared. For the quantitative analysis, the number and type of features per category along with feature scores can be used to create many mathematical relationships among the categories and overall websites being compared. The results of these analyses by classification reveal the comparative balance and likely overarching communications strategy and goals of each UI.

Some or all of the features in Absent Features 1000 are assessed to determine the market cost of implementing these features. These cost estimates, referred to as Potential New Features Costing 1600, are preferably stored in the UI Feature Database 700.

Having completed the comparative analyses represented by Feature Categorization 800, it is possible to suggest remedies and change the feature mix to adjust the balance of categories for the Primary UI 100. These Feature Categorization Remedies 900 may be applied directly to the Primary UI 100. In an alternative embodiment, the remedies are applied to modify or establish the list of features, Prospective New Features 1200, that will be tested in the Market Research 1300 described henceforth. Feature Categorization 800 and 900 represent Module C: Feature Categorization.

Having completed Modules A, B and C, as well as Potential New Feature Costing 1600, substantial information is available to determine the list of features that will be tested in Market Research 1300. Referred to as Prospective New Features 1200 in FIG. 1, this list may be a subset of the list of Absent Features 1000. The preferred embodiment, which should not be seen as a limitation of the Prospective New Features 1200 list, is to have 10 features. The 10 features are determined by analyzing the information in Absent Features 1000 (from the Primary UI 100), Feature Categorization 800 and Potential New Features Costing 1600 to create a short list of prospective new features that are most likely to add value to the Primary UI 100.

The preferred embodiment of Market Research 1300, which is not limited to this form, is online market research. Online market research utilizes web-based programs to capture questionnaire response data. Further, online market research provides a means to display a user interface of a computer program that utilizes graphical representations to express the Constant Sum Scale. A graphical representation of a computer program of a Constant Sum Scale is not available anywhere in the current marketplace and is a unique capability of 'A Feedback Loop for the Assessment of a User Interface (UI) of a Communications Network.'

By way of clarification, with respect to a user interface, graphical user interface (GUI) and computer program, the following information is offered. On a practical level the software, that enables the computer system to perform the operations described in detail herein, may be supplied on any one of a variety of media. Furthermore, the actual implementation of the approach and operations of the invention are actually statements written in a computer language. Such computer language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media" may include a diskette, a tape, a compact disc, an integrated circuit, a ROM, a CD, a cartridge, a memory stick or card, a remote transmission via a communications circuit, or any other medium useable by computers, including those now known or hereafter developed. For example, to supply software for enabling a computer system to operate in accordance with the invention, the supplier might provide a disc or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a disc, "embodied in" an integrated circuit, "carried over" a communications circuit, "stored in" a memory chip, or "loaded in" a cache memory, it will be appreciated that, for the purposes of this application, the software will be referred to simply as being "in" or "on" the computer readable medium. Thus, the terms "in" or "on" are intended to encompass the above mentioned and all equivalent and possible ways in which software can be associated with a computer readable medium.

For the sake of simplicity, therefore, the term "computer program product" is thus used to refer to a computer readable medium, as defined above, which has on it any form of software to enable a computer system to operate according to any embodiment of the invention.

The invention is also embodied in a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like.

As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of this invention, that an actual user ever interact with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

When a display region (typically consisting of commonly known and understood words and graphics) overlays the binary code, text or graphical elements of computer instructions contained in computer programming languages, then the user interface is often referred to as a Graphical User Interface (GUI). When interacting with a GUI, the user is preferably responsible for manipulating (selecting, moving, clicking, placing, etc.) display regions but not inputting symbols or text characters.

In this embodiment according to the invention, Market Research 1300 utilizes a computer program product with a GUI (refer to FIG. 3 for the basic GUI diagram) for at least one Constant Sum feedback unit to determine which current and/or prospective features of a website are most important to targeted customers. Targeted customers, also referred to herein as qualified respondents within the context of market research, may be identified in a variety of ways, including by the Primary UI100's company as important or desirable customers. The Constant Sum feedback unit of a computer program product, in a preferred embodiment, contains instructions that direct the respondent to allocate a discrete number of evaluation tokens among the list of features in Prospective New Features 1200. The instructions shown in FIG. 3 may be understood as a first display region including a constant sum evaluation prompt.

Figure 3:
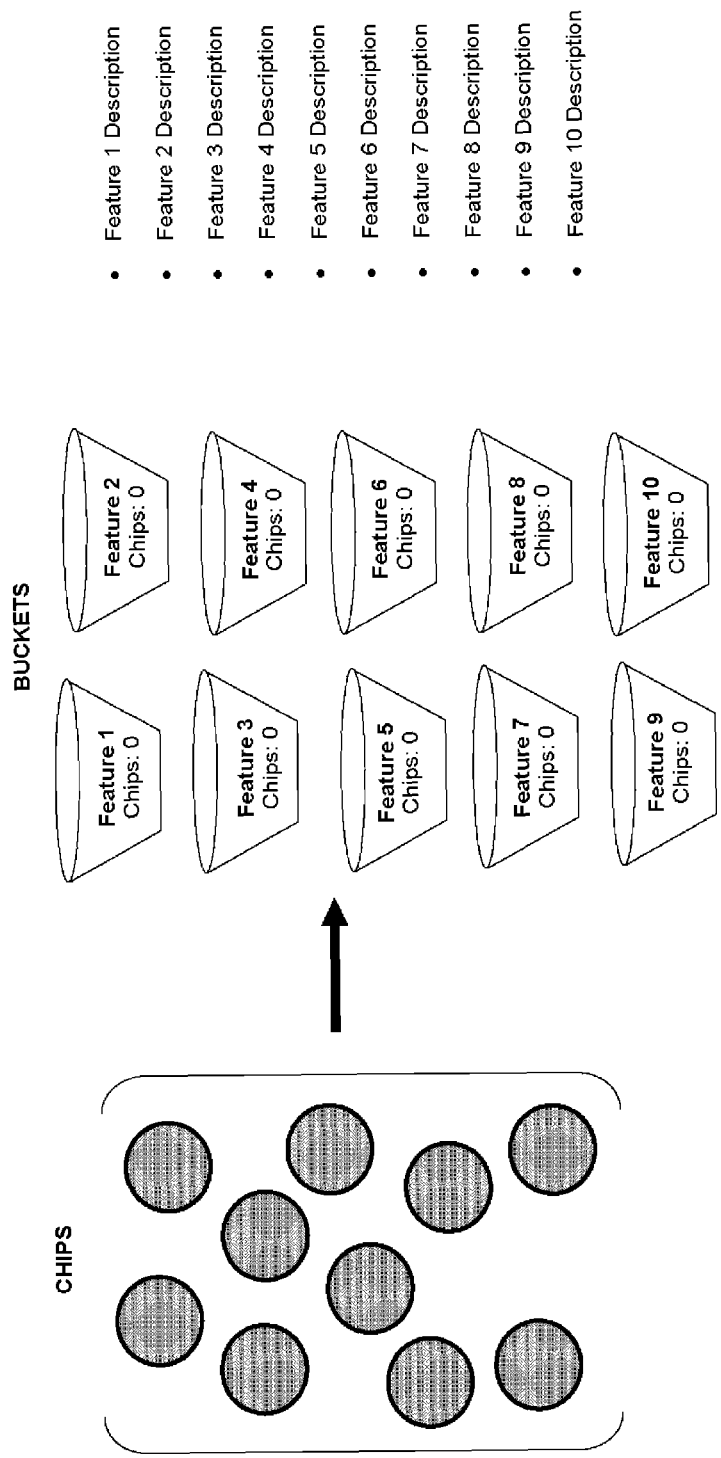
FIG. 3 is a diagram of the basic elements of the GUI of a computer program product of a Constant Sum Scale.

A graphical representation (e.g., chips, 'play money' or other symbols) of evaluation tokens may be used and these graphical evaluation tokens can be moved by the respondent onto one of the plurality of evaluation selection items, known here as features in the preferred embodiment of a feedback loop for evaluating a user interface. The plurality of evaluation selection items (features) may be represented in any number of ways, including short word descriptions, visual buckets or other graphical forms in the computer program product. As the respondent moves the graphical evaluation tokens onto the graphical plurality of evaluation selection items, then an indicator of the evaluation selection item preferably acknowledges and displays a count of the tokens that have been allocated to it. While 10 or 100 evaluation tokens are the preferred embodiment, any number may represent the total scale. In FIG. 3, the collection of buckets may be understood as a second display region including a plurality of evaluation selection items. The feature descriptions may optionally be considered as part of the second display region.

A visual representation of evaluation tokens in a computer program product allows respondents to make allocations without having to do any mathematical addition or calculation. In a preferred embodiment, respondents merely have to place or 'drag-and-drop' evaluation tokens onto any of the features they prefer until all of the tokens have been allocated. Respondents can distribute the tokens in any amount as long as the total amount of tokens distributed equals the total amount allocated, which using the preferred embodiment is 10 out of 10 (using a 10 point scale) or 100 out of 100 (using a 100 point scale). The collection of chips to be placed in buckets may be understood as a third display region graphically depicting a plurality of evaluation tokens.

The underlying software that allows the user to make allocations by, e.g., "drag-and-drop," may be thought of as a user interaction module adapted to permit the user to make a correspondence indication for the evaluation tokens, whereby the user gives each one of the evaluation tokens a correspondence with only one of the evaluation selection items. The correspondence could be indicated by dropping in a bucket, or any other reasonable graphical approach.

The underlying software that senses when all evaluation tokens are used up may be thought of as detecting a completion state such that the correspondence indication has been made for all of the evaluation tokens.

The computer program product, when used in this embodiment as part of an online market research survey, captures the data that is the basis for statistical information describing the comparative importance of the tested features. The total number of evaluation tokens received for each feature provides a rank order of the overall value of each feature. Examining the frequency and distribution of evaluation tokens shows the magnitude of preference among individuals and subgroups of the tested population. All data may be cross tabulated to allow respondent segmentation so that analysis and recommendations can be directed to the most desirable, targeted customer segments. These quantitative results may be used to make projections and summary analyses of targeted customers, subgroups, or the entire user base of a company's website.

The underlying software that keeps track of how many tokens are received for each feature may be thought of as storing in memory an evaluation result relating to the evaluation prompt, based on the quantity of the evaluation tokens indicated in the correspondence indication as corresponding to the respective ones of the evaluation selection items.

Questions in addition to the Constant Sum Scale question may be used in the surveys of Market Research 1300.

The results of Market Research 1300 may be stored in Market Research Results Database 1400. Additional statistical analysis, such as regression, frequency distribution, and standard deviation may be applied for greater understanding of the relationships within the data; this analysis is shown as Data Analysis 1500 in FIG. 1. This analysis also may be stored in Market Research Results Database 1400.

The results of Data Analysis 1500 reveal the features that are most important overall and most important for critical subsets of the Primary UI's targeted customers.

Results of Data Analysis 1500 include rank order and frequency distribution, which reveal the magnitude of preference among features. This understanding of the relative magnitude of preference means that the economic value of individual features can be compared. That is, by applying coefficients based on magnitude of preference to the projected cost of developing and implementing each feature, it is apparent whether more expensive features are worth the cost and whether less expensive features might be particularly effective given their lower price. With the application or analysis of feature cost, it is possible to determine Most Important New Features 1700, the most important and valued prospective features, and complete Module D: Future Feature Identification.

Figure 2:
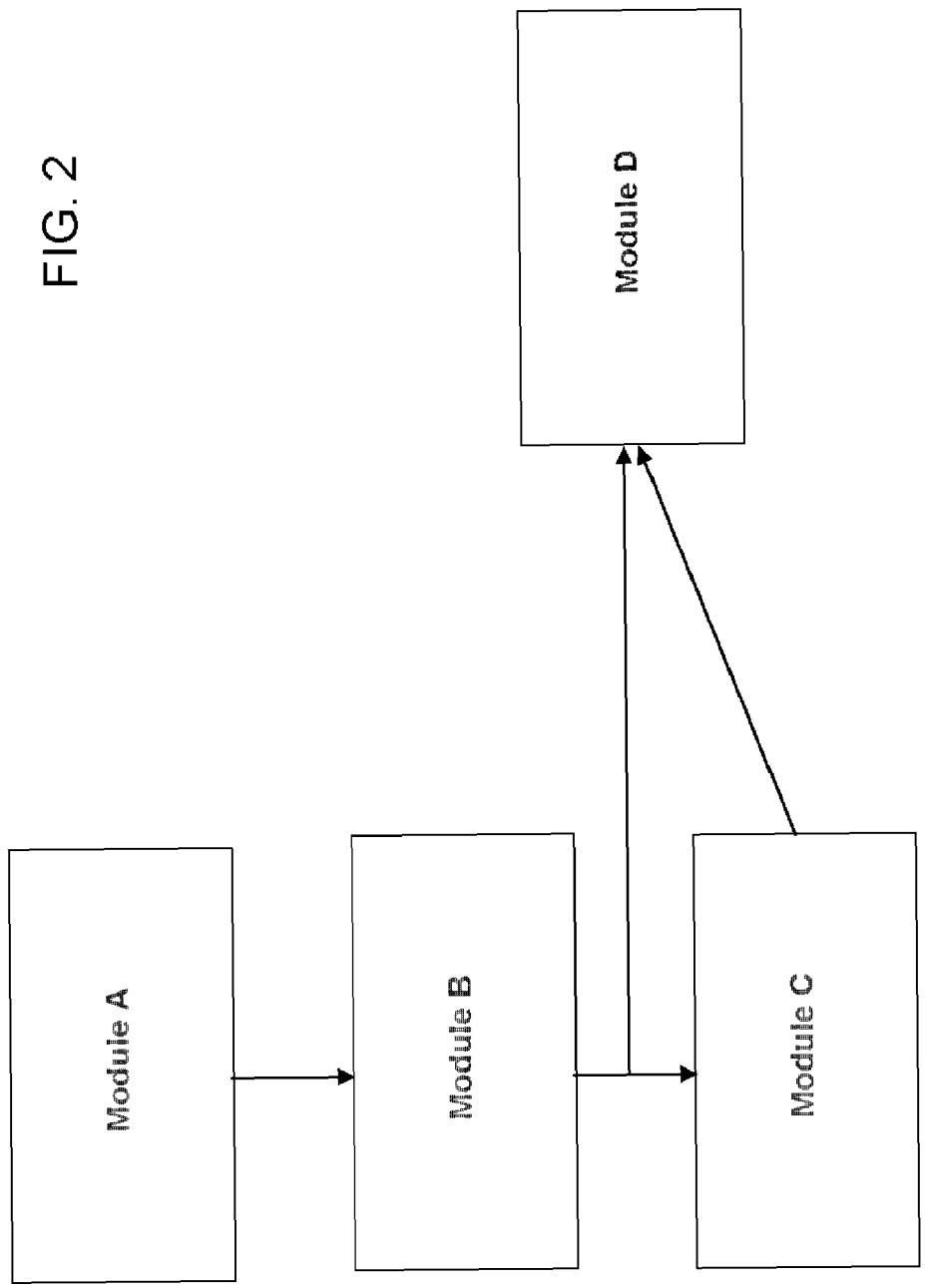
FIG. 2 is an overview schematic of Module interaction; and
c.

FIG. 2 shows the interaction of Modules A, B, C and D.

Module D provides a basis for creating a Future Features Roadmap 1800. This Future Features Roadmap 1800 closes the feedback loop by documenting the new features that will be developed for the Primary UI 100. The Future Features Roadmap 1800 typically includes the order, timing and costs associated with implementing the new features as well as any development contingencies among the various features.

Embodiment 2

According to this embodiment, market research involving websites is carried out, but not necessarily with a constant sum scale question. A feature identification module receives feature identification inputs relating to a primary UI and a plurality of comparison UI's. These feature identification inputs indicate discrete UI features. A feature rating module receives user ratings pertaining to the discrete UI features of the primary UI and the comparison UI's. An absent feature identification module provides an absent feature list, based on a comparison of the identified discrete UI features of the primary UI and the identified discrete UI features of the comparison UI's. As to the features in the absent feature list, user inputs are obtained to determine which absent features are most desirable.

Embodiment 3

According to this embodiment, which is not necessarily related to the evaluation of any website, market research is carried out using a computer program product with a GUI such as that shown in FIG. 3, and a Constant Sum feedback unit. In this embodiment, the Constant Sum approach is used more broadly to determine consumer preferences with respect to current and/or prospective features of anything. That is to say, although the first embodiment involved the use of a Constant Sum Scale question in a particularly useful implementation, it is recognized by the inventor that the disclosed system, method, computer program product, and graphical user interface for implementing a Constant Sum Scale question will be applicable in other contexts. In fact, the approach may be successfully applied to market research involving practically any context in which preference information is to be collected. As just one example, inputs could be obtained as to preference information relating to automobile features or dishwasher features.

Other Variations

Many variations to the above-identified embodiments are possible without departing from the scope and spirit of the invention. Possible variations have been presented throughout the foregoing discussion. Moreover, it will be appreciated that the system is implemented, in a concrete manner, with at least a general purpose computer system having a processor and a memory under control of the processor, storing computer readable instructions for the processor to perform. Likewise, although some aspects of the system have been described as being best implemented by resort to manual steps, it will be appreciated that it is mainly the subjective aspects that require human input, and that the input is received by a computer system and stored by automated means. Therefore, almost every aspect of the preferred embodiment is either performed by a computer or at least implemented with a computer for support. It will also be understood that various steps implemented by a general purpose computer system may be implemented with a special purpose computer system, or a custom-made computer device.

Moreover, it will be understood that the manipulation by the user of graphical tokens in the embodiments using the Constant Sum Scale approach can more generally be understood as a method for conducting online market research by way of the manipulation of graphical elements instead of requiring user textual or numeric inputs. Thus, a variation that comes within the scope and spirit of the invention may include the manipulation of graphical elements that are not necessarily tokens, but which allow the user to express preferences and accept tradeoffs, among alternatives, by the manner in which the various graphical elements are manipulated (i.e., dragged and dropped, positioned, or the like). In such a variation, even though a Constant Sum Scale approach might be replaced by another approach, such as conjoint analysis or the like, the conduct of the market research is simplified and streamlined from the user point of view.

Combinations and subcombinations of the various embodiments described above will occur to those familiar with this field, without departing from the scope and spirit of the invention. ®2006 Paul Rider.

What is claimed is:

1. A feedback loop system for assessing a user interface (UI) of a communications network with a non-transitory memory stored therein, comprising:
   a feature identification module programmed to receive feature identification inputs relating to a primary UI and a plurality of comparison UI's, the feature identification inputs indicating discrete UI features;
   a feature rating module programmed to receive user ratings pertaining to the discrete UI features;
   a feedback unit programmed to obtain user inputs regarding one or more of the discrete UI features;
   an absent feature identification module programmed to provide an absent feature list based on a comparison of the identified discrete UI features of the primary UI and the identified discrete UI features of the plurality of comparison UI's;
   wherein the feedback unit is a constant sum scale feedback unit for obtaining the user inputs regarding the one or more of the discrete UI features, and wherein the feedback unit obtains the user inputs using a constant sum scale user interaction with a user;
   wherein the user interaction comprises a displayed representation of scale elements in the form of a plurality of evaluation tokens, wherein each evaluation token is provided with a fixed equal value such that the user does not enter a value for the evaluation tokens, and wherein the user interaction comprises dragging one of the evaluation tokens to a selected location; and
   a processor programmed to access and execute said modules and unit.

2. The system as set forth in claim 1,
   wherein the user inputs obtained with the feedback unit relate to ones of the discrete UI features included in the absent feature list.

3. A method for assessing a user interface (UI) of a communications network, comprising:
   receiving feature identification inputs relating to a primary UI and a plurality of comparison UI's, the feature identification inputs indicating discrete UI features;
   receiving user ratings pertaining to the discrete UI features;
   obtaining, by a processor and a memory, user inputs regarding one or more of the discrete UI features;
   providing an absent feature list based on a comparison of the identified discrete UI features of the primary UI and the identified discrete UI features of the plurality of comparison UI's;
   wherein the user inputs regarding the one or more of the discrete UI features is obtained using a constant sum scale feedback, and wherein the user inputs are obtained using a constant sum scale user interaction with a user;
   wherein the user interaction comprises a displayed representation of scale elements in the form of a plurality of evaluation tokens, wherein each evaluation token is provided with a fixed equal value such that the user does not enter a value for the evaluation tokens, and wherein the user interaction comprises dragging one of the evaluation tokens to a selected location.

4. The method as set forth in claim 3 wherein the user inputs obtained with the feedback unit relate to ones of the discrete UI features included in the absent feature list.

* * * * *